United States Patent [19]
Bavaro et al.

[11] Patent Number: 6,107,744
[45] Date of Patent: Aug. 22, 2000

[54] BACK-UP ELECTRICAL SYSTEMS

[76] Inventors: Joseph P. Bavaro, 16 Pheasant La., Topsfield, Mass. 01983; Joseph S. Russo, 5 Joseph Ave., Peabody, Mass. 01960

[21] Appl. No.: 08/976,716

[22] Filed: Nov. 24, 1997

Related U.S. Application Data

[63] Continuation-in-part of application No. 08/563,918, Nov. 29, 1995, Pat. No. 5,734,229.

[51] Int. Cl.[7] ................................................... H05B 37/00
[52] U.S. Cl. ......................... 315/86; 315/87; 315/209 R; 315/219; 315/225
[58] Field of Search ................................. 315/86, 87, 57, 315/154, 209 R, 219, 225, 175; 362/20

[56]   References Cited
U.S. PATENT DOCUMENTS

| | | | |
|---|---|---|---|
| 4,454,452 | 6/1984 | Feldstein | 315/86 |
| 4,682,078 | 7/1987 | Pascalide | 315/86 |
| 5,004,953 | 4/1991 | McDonald | 315/86 |
| 5,416,384 | 5/1995 | Bavaro | 315/86 |
| 5,426,347 | 6/1995 | Nilssen | 315/209 R |

*Primary Examiner*—Haissa Philogene
*Attorney, Agent, or Firm*—G. Kersey

[57]   ABSTRACT

A back-up power system which can accommodate a standard electrical device that is operable from an alternating current power source when alternating current is available, but is operable by a direct-current to direct-current converter when alternating current is unavailable, the converter being powered by replaceable low voltage battery charged by the alternating current source, with the loss of alternating current being sensed to cause the disconnection of the alternating current source and connection to the low-voltage replaceable battery.

20 Claims, 10 Drawing Sheets

BACK-UP ELECTRICAL SYSTEMS

CROSS REFERENCE TO RELATED APPLICATIONS

This is a continuation-in-part of Ser. No. 08/563,918 filed Nov. 29, 1995, now U.S. Pat. No. 5,734,229 which is incorporated herein by reference.

RIGHTS UNDER FEDERALLY SPONSORED RESEARCH

The present invention has not resulted from Federally sponsored research.

BACKGROUND OF THE INVENTION (a) Field of Invention

This invention relates to alternative lighting and power sources, and more particularly, to retrofit back-up electrical systems, as well as wall mounted, recessed, downlighting and other devices.

Natural disasters, i.e., hurricanes, tornadoes, earthquakes, floods, ice storms, lightning storms and blizzards are inevitable and repeated occurrences. They can result in utility company power failures that can place their customers at risk. Consequently, there is a need for arrangements that can be used in, and with, electrical devices, such as a table lamps and light fixtures, to function in the face of power failures.

(b) Description of the Prior Art

Attempts have been made in the past to provide back-up and general lighting in a fixture or lamp in the event of a mains power failure. However, all such prior devices must be hard-wired and installed either by a qualified and licensed electrician, or a person skilled in installation. Additionally all prior devices either restrict the user to a particular type of fixture, or a design adapted only for a particular decor.

Although prior devices respond and enter a DC (Direct Current) back-up mode when AC (Alternating Current) is not available, none can be installed into standard lighting fixtures without considerable expense, labor and compromise of style. The specific installation requirements of prior devices limit the decor to a particular design. Moreover, none of the prior art devices can be used in different types of lighting fixtures to give general and backup lighting, while incorporating replaceable and rechargeable batteries. Nor can prior art devices be used in different types of lighting without requiring special installation and "hard wiring" to a constant source of uninterrupted Alternating Current power.

Another shortcoming of the prior art is the failure to protect back-up DC batteries from excessive heat. The prior art cannot be portable and used in different areas in the event AC main power is not available.

Accordingly, there is a need for back-up lighting that overcomes the prior shortcomings.

It is the object of the invention to reduce the installation cost associated with emergency back-up lighting, and make available reliable back-up lighting that is both aesthetically pleasing and suitably operational for any area where the safety and convenience of back-up lighting, or power, are desired.

SUMMARY OF THE INVENTION

In accomplishing the foregoing and related objects, the invention provides a back-up power system for an electrical device that is powerable from a primary energy source, with the sensing of any interruption of power from the primary energy source, followed by energizing of an electrical device that is energized from an alternative or secondary energy source, after conversion to an alternative energy state. An output from the alternative energy source powers the electrical device during any interruption of power from the primary source.

In accordance with one aspect of the invention an installation is provided that can be switched "on" and "off" in the DC (Direct Current) back-up mode when AC (Alternating Current) mains are not available. Additionally the invention protects the back-up source, such as a DC battery, from excessive heat and can completely isolates the back-up source from heat generating components.

In accordance with another aspect of the invention, the alternative energy source is rechargeable, such as that provided by a rechargeable battery. The electrical device can be a fluorescent bulb, with the alternative energy source generating DC (Direct Current), which is converted to a different form of energy, such as AC (Alternating Current) and/or a different form of Direct Current. The different form of Direct Current can be further converted and used to energize the device.

In accordance with a still further aspect of the invention the restoration of power from the primary source can be sensed and accompanied by disconnecting the alternative energy source and terminating the output of converted Direct Current. The primary source is reconnected to restore the device to the condition that existed before interruption of power from the primary source.

The invention also provides a conductive path having one end connectable to a primary energy source and an opposite end connected to a secondary energy source; and a switch having open and closed positions inserted into the path, with the switch being by-passed by an impedance element; so that connection of the path to the primary source, with the switch open permits energy to flow to the secondary source.

Where the primary source supplies Alternating Current, an Alternating Current line ballast can be included for powering the device. The alternative energy source can energize a Direct-Current to Direct-Current converter. A line ballast can operate the device when alternating current is present, and a Direct-Current to Direct-Current converter can operate the device when Alternating Current is not present.

The alternative energy source can be a replaceable battery installed to be easily removed and replaced, formed by a cell pack that fits into a hollow compartment, with the backup power system being used for lighting by a retrofit back-up bulb.

The backup power system can be wall mounted, or adapted in a wide variety of ways, including recessed downlighting.

In a method of the invention for providing a back-up power system, the steps include (a) connecting a device to a primary energy source; (b) sensing any interruption of power from the primary energy source; and (c) energizing the device from an alternative Direct-Current energy source after conversion to an alternative Direct-Current state when the interruption of power from the primary energy source is sensed, and maintaining the alternative energy input during the interruption of power.

In accordance with a specific aspect of the invention a packaged backup power module includes replaceable and rechargeable batteries connectable to a replaceable bulb. The module can be inserted into a socket that is connected to the AC mains, or the module can be used in a wall mount or a recessed lighting fixture. In either case, the bulb associated with the module or the lighting fixture is lighted during normal operating conditions when AC line power is present. When the bulb is fluorescent, the lamp operating on AC current is powered through a fluorescent ballast within the module or mounted on a bracket of the wall mount fixture.

The bulb can be turned "on" and "off" by a switch which can be wall mounted and designed to send a trickle charge to the rechargeable battery when the switch is in the "off" or open contact position when AC main power is available. This allows the user to control AC "on" and "off" operation from a remote location. When AC power is present, the remote switch is in the "on" position so that an indicator such as a light emitting diode operates and a trickle charge is sent to the battery.

When AC power is not present, the battery is connected through a relay or electronically to operate a converter or inverter which supplies power to the same bulb that was illuminated during AC operation. If the switch is in the "off" position, and AC power is not present, the bulb is not lighted in the back-up mode.

The battery inside the base of the table lamp is replaceable by an easily removable nut, holding the base cover and connected to a threaded nipple, thereby allowing removal of the base cover and the battery to facilitate replacing the battery. The connector allows the battery to be removed and replaced from inside the table lamp base. The battery is connected to a slide switch located on the lamp base to allow the battery to be disconnected from the circuit to disable the DC to DC converter and allow the user back-up capacity when needed, thereby increasing backup capacity or preventing the automatic transfer of back-up capacity from taking place.

An LED (light emitting diode) indicator is not lighted when the slide switch is in position to disable the battery, thereby preventing operation of the DC to DC converter, and the other component parts necessary to provide back-up lighting. However normal operation when AC main power is available can still take place. A harp saddle of the lamp is connected to an upper nipple, which is held by a nipple nut. The saddle holds the harp, and the harp holds a lamp shade.

When the LED indicator mounted on the lamp base is lighted, the slide switch is in position to energize the battery when the AC main power is present, thereby causing the circuit, in the event of the AC main power loss, to transfer power to the DC to DC converter and drive the lamp in the back-up mode. The LED is not lighted when the AC main power is not present.

BRIEF DESCRIPTION OF THE DRAWINGS

Other aspects of the invention will become apparent after considering several illustrative embodiments taken in conjunction with the drawings in which.

Figure 1A:
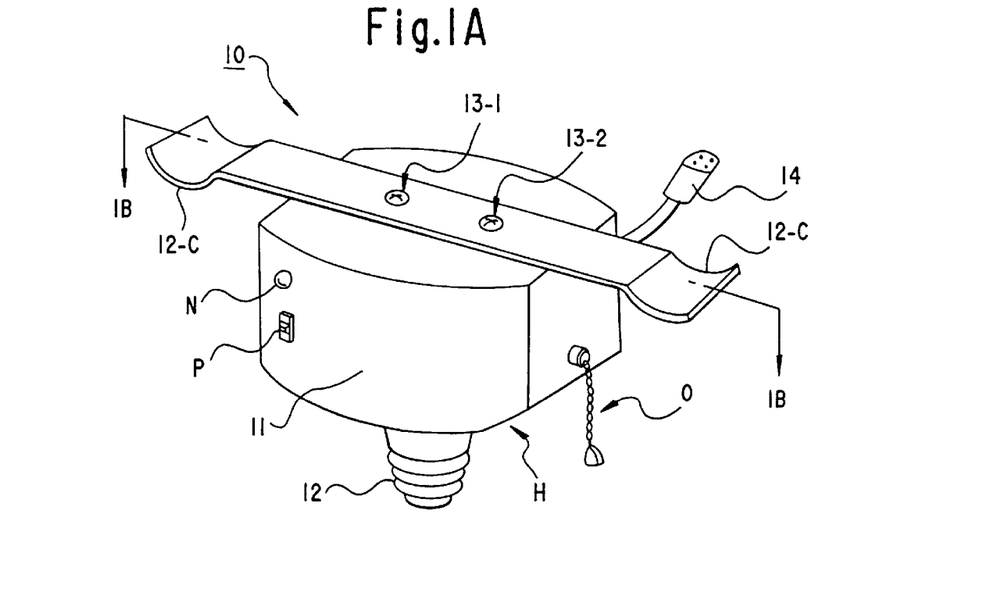
FIG. 1A is a perspective view of an electrical fixture for a conventional electric socket and contains a back-up system that operates in the event of a power failure.
Figure 1B:
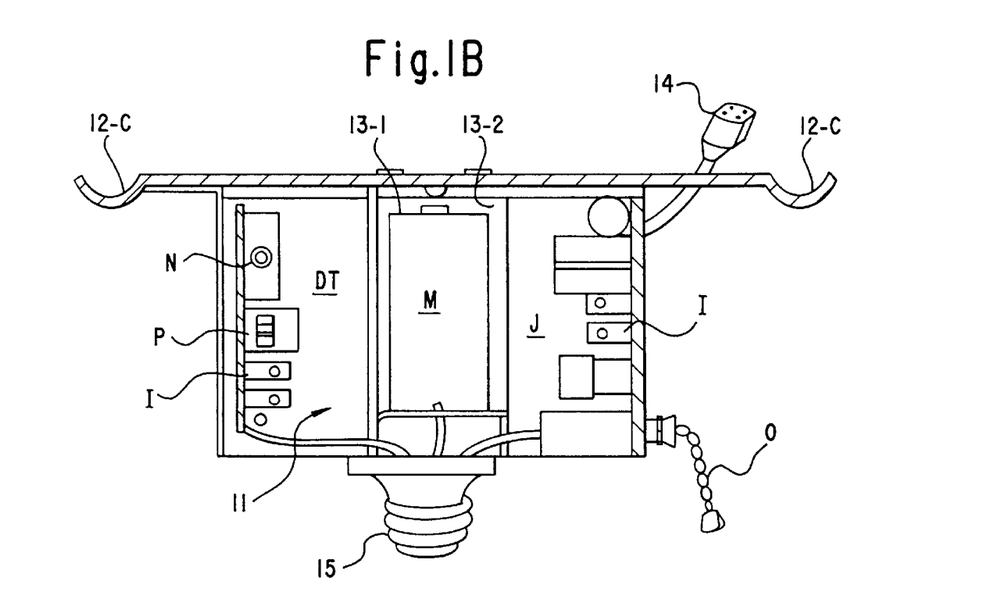
FIG. 1B is cross-sectional view of the electrical fixture of FIG. 1 taken along the lines 1B—1B.
Figure 1C:
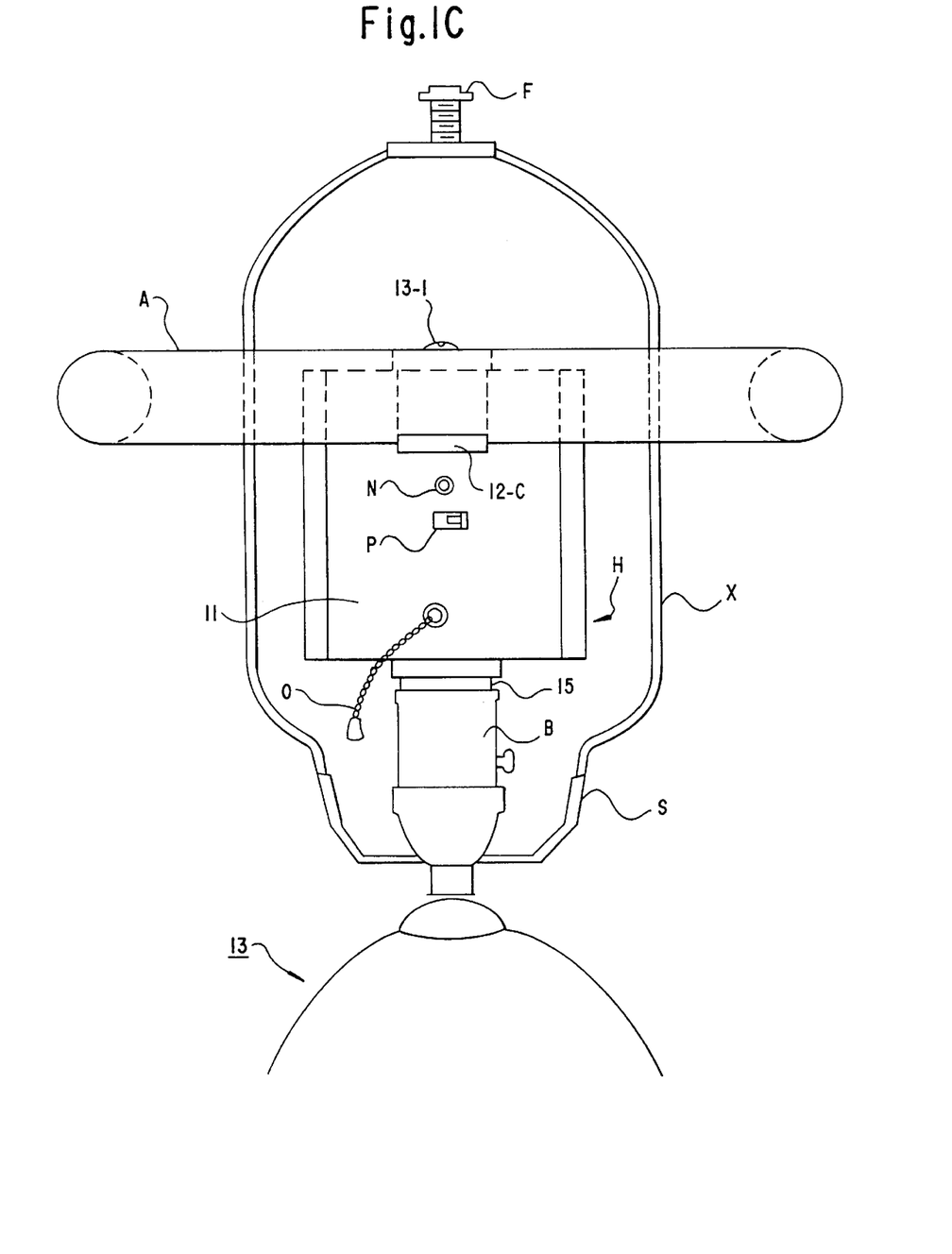
FIG. 1C is a schematic view showing the fixture of FIG. 1A inserted into the socket of a table lamp.

DETAILED DESCRIPTION OF THE PREFERRED EMBODIMENTS (a) FIGS. 1A–1C

With reference to FIG. 1A, an electrical device in the form of a fixture 10 for a conventional electric socket (not shown) contains a back-up system 11, as shown in FIG. 1B, that functions in the event of a power failure. The fixture 10, as shown in FIG. 1C, is able to be used with a long-life and replaceable fluorescent bulb A that is mounted on the bracket 12 and held in position by end clamps 12-c. The bracket 12 is secured to the fixture 10 by screws 13-1 and 13-2. The bulb A is connected to the fixture 10 by a socket insert 14. The Threaded base 15 of the fixture 10, after the threaded base 12 of the fixture 10 is inserted inside the socket B of the table lamp 13.

The fixture 10 requires no assembly. When it has a standard base 15, it can be inserted into any in any standard socket, and it is ready to operate. As long as AC main power is available, for example, at the socket B by having the lamp 13 plugged into an electrical outlet, the lamp 13 can trickle charge a replaceable low voltage battery M located at the housing H of the fixture 10.

Alternatively, the fixture 10 can be inserted into a switch controlled outlet, such as a ceiling outlet, and the invention provides, as explained below, for trickle charge of the battery M even when the control switch is in its "off" position.

The circuitry of FIG. 2A, discussed in detail below, for the fixture 10 illustratively operates with the standard portable fluorescent bulb A of FIG. 1C. When AC main current is available, the standard bulb A is operational so that the lamp light is at maximum brightness. An on-off pull switch 0, located on the side of the housing H, allows a user to switch the light "on" and "off".

When the main current is not available, the battery M, shown in FIG. 1B, powers the bulb A that was energized when AC main current was available.

The back-up power can be interrupted by a separate slide switch P located on an adjacent side of the housing H in relation to the pull switch O. An LED (Light-Emitting Diode) N is also mounted next to the slide switch P. The slide switch P allows use of the back-up capacity of the battery M when the user wants to turn on the light in the back-up mode, when AC main power is not available, thus allowing extended use of the back-up capacity. The slide switch P also gives the user the option to prevent automatic operation in the back-up mode in the event AC main power is lost during day- light, or when the user is sleeping.

The LED N is mounted next to the slide switch P, so that when the LED N is lighted, it indicates that the table lamp 13 is in a stand-by mode. If the slide switch P is moved to the opposite, unlighted position, it will prevent the table lamp 13 from automatically going into the back-up mode when AC main current is not available.

Further, an unlighted condition of the LED N indicates that the table lamp 13 will not automatically go into back-up mode when the AC main current is not available. In the embodiment of FIGS. 1A–1C the standard portable fluorescent bulb A is powered directly from the AC line through a fluorescent ballast J within the fixture 10.

(b) Circuitry for FIGS. 1A–1C

Figure 2A:
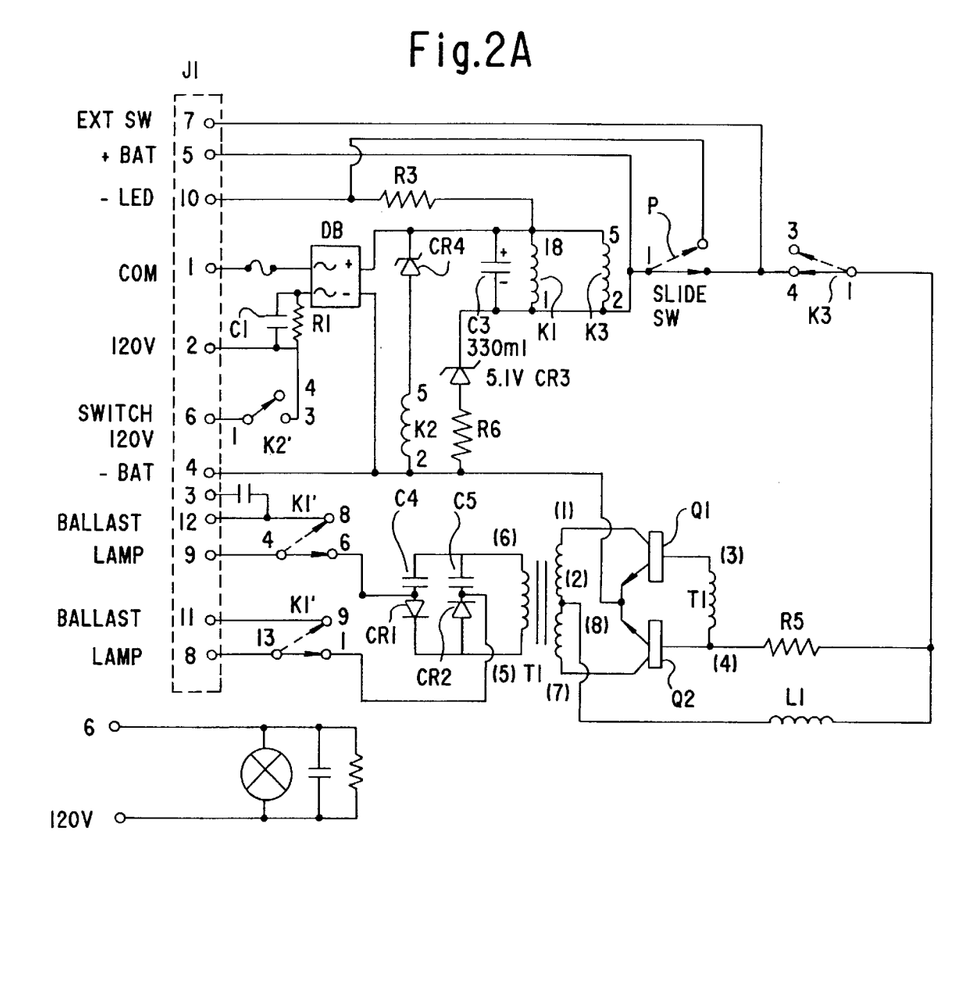
FIG. 2A is a circuit diagram for the back-up power system included in the fixtures of FIGS. 1A through 1C.
Figure 2B:
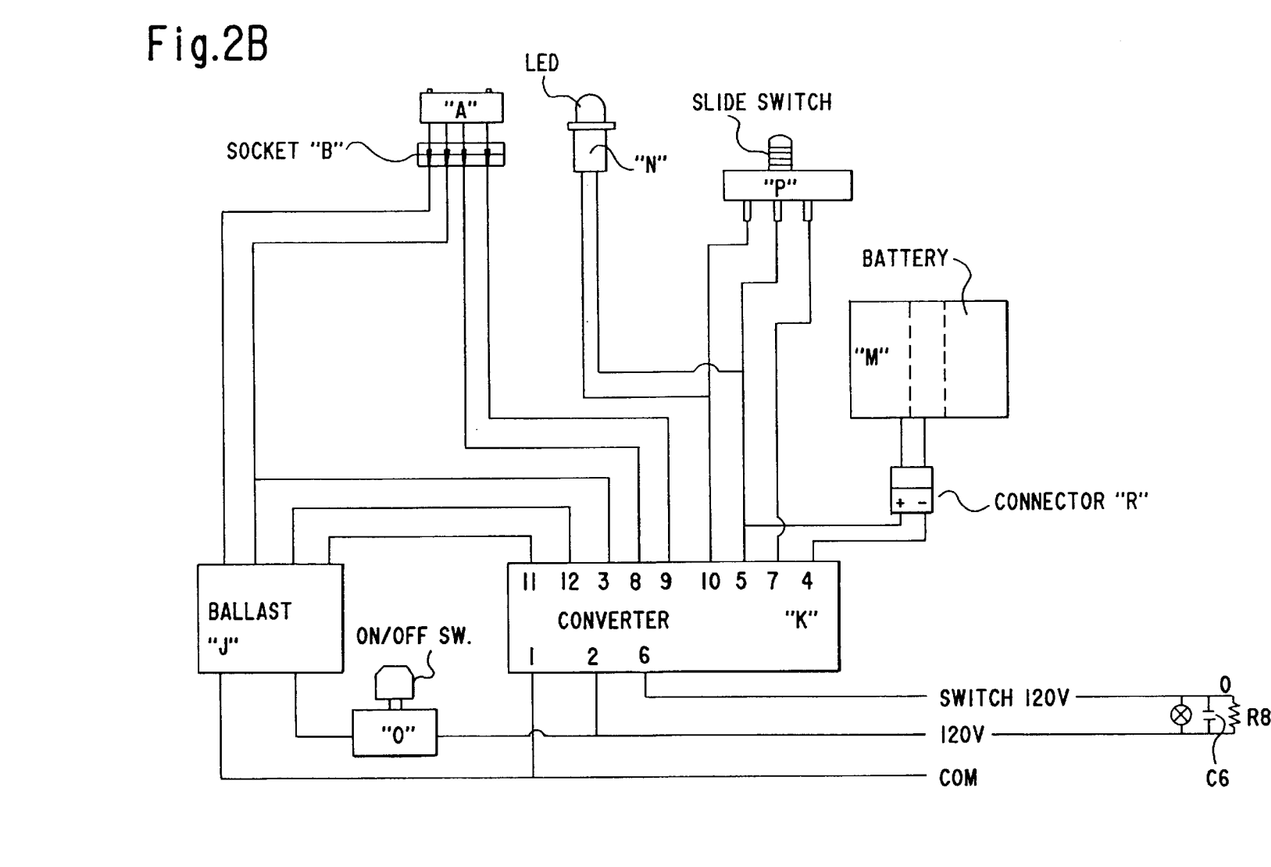
FIG. 2B is a diagram showing point-by-point wiring and internal parts for the fixtures of FIGS. 1A–1C.

Referring in detail to the circuit diagram of FIG. 2A for the back-up power system included in the fixture 10 of FIGS. 1A through 1C, and the wiring diagram of FIG. 2B, the fixture 10 converts the table lamp 13 of FIG. 1C into a two-in-one light that incorporates the standard replaceable and compact energy-saving fluorescent bulb A.

When the AC main power is not available the lamp 13 becomes a back-up portable table lamp, lighting the same bulb A in the back-up mode that was lighted when the main power was present. When the AC main power is present, power is supplied through a fluorescent electronic ballast or standard magnetic ballast J. The absence of AC main power is sensed, illustratively through relays, and the lamp is automatically transferred to the battery back-up M. This is accomplished by DC to DC Conversion within an electronic converter DK, as described below.

The DC to DC Converter DK of FIG. 2A

The circuitry of the DC to DC converter DK has three functions: First, a trickle current is supplied by a charging circuit to keep the battery M charged; Second, there is detection and sensing of the absence of AC main power and initiation of the switch to battery back-up; Third, a low voltage DC is converted to a high voltage to energize the fluorescent bulb A.

Charging Circuit

In FIG. 2A, AC main power is applied to a full wave bridge rectifier DB inside converter DK through a series current limiting capacitor C1 rated at 120 volts for standard AC mains. This produces DC current to operate two parallel sensing relays K1 and K3, with contacts K1' and K3'. The parallel relays K1 and K3 are in series with the battery M which receives a trickle charge from the relay current flowing into terminal 5 of the connector J1. When the fixture 11 is in a lamp, such as the lamp 13 of FIG. 1C, and the lamp is connected to AC mains from terminals 1 and 2 of the connector J1 in FIG. 2A, the trickle current flows as long as the lamp is connected and the mains are operative.

Alternatively, when the fixture 11 is switch operated, as when the fixture is in a ceiling holder that is controlled from a wall switch W in FIG. 2B, the switch W is shunted by a capacitor C6 and a resistor R8 of substantial resistive magnitude. In that case W is connected to terminal 6 of the connector J1 and relay K2 closes contacts K2' to produce the desired trickle charge.

An LED N is connected across terminals 5 & 10 of connector J1 in parallel with the relays K1 and K3. The LED N lights to give a visual indication that the back-up power supply M is "on" and the slide P switch is in position to allow the DC power supply to automatically transfer if the AC main power is lost.

Sensing Circuit

With the absence of the AC main power, the sensing relays K1 and K3 become de-energized, causing the lamp A that was in the AC mode supplied by a fluorescent magnetic or electronic ballast J, to be switched to the circuit of the DC converter DK. This is accomplished through the contacts K1' of the relay K1.

AC and DC Conversion Circuitry

With the de-energizing of the K3 sensing relay of FIG. 2A, the contacts K3' close, enabling current to flow through resistor R5 and choke L1 of a push-pull multi-vibrator PP formed by transistors Q1, Q2 and transformer T1. The relatively low magnitude voltage of battery M is transformed into a high-frequency voltage of increased magnitude, for example 500 volts at a frequency of 25 KHZ (KiloHertZ).

The capacitors C4 and C5, in conjunction with the diodes CR1 and CR2, form a DC voltage doubler and produce the necessary DC high voltage and low current at terminals 8 and 9 to ionize the gas in the fluorescent bulb A.

Modularity

The DC to DC converter DK is modular and contains all electronic components, relays and the like, for operation of the lamp A for both the presence and absence of AC main power. Further, the modular converter DK contains the charging, sensing and converter circuitry, all in one modular part.

The lamp 13 appears standard, except that when the AC main power is lost, the lamp automatically comes on. Since the lamp 13 can be plugged into a standard house-current outlet, it is useful for both normal and backup use. It also can be switched "on" and "off" both when AC main power is available and not available.

All components, including the ballast J to drive the lamp A when AC main power is available, the DC to DC converter DK to drive the lamp A when AC power is not available, the battery charger DB, the replaceable low voltage battery M, and all other components that operate the lamp A, whether or not AC main power is available, are located inside the housing H.

When AC main power is not present—due to a power or circuit breaker failure or fuse trip—the same standard replaceable compact fluorescent bulb A that was lighted when the AC main power was available is automatically lighted regardless of the prior position of the pull switch 0 after the loss of the AC main power.

When the circuitry senses the loss of AC main power, relay K1 disconnects the AC portion of the circuit and connects the DC to DC converter DK, which is powered and connected to the low voltage replaceable battery M. When the AC main power is restored, the circuit senses the presence of the AC main power, relay K1 disconnects the DC to DC converter DK and reconnects the AC main power, thus restoring the bulb A in the lamp 13 to where it was prior to the loss of AC main power.

The AC line magnetic or electronic ballast J is included for powering the standard replaceable compact fluorescent bulb A, which is inserted in the socket B of the table lamp 13. The AC line magnetic or electronic ballast J operates the standard replaceable compact fluorescent bulb A when the AC main current is available. The AC line magnetic or electronic ballast J is located inside fixture 10. However, the AC line magnetic or electronic ballast J remains accessible for repair or replacement by standard removable parts which are an integral part of the hardware necessary to mechanically hold the fixture 10 together.

Further, inserting the AC line magnetic or electronic ballast J inside the fixture 10 facilitates the operation of lamp 13 for both the presence and absence of AC main power.

In addition, insertion of the ballast J in the fixture 10 hides it, allowing the lamp 13 to have a decorative appearance that makes it suitable for areas that require a decorative setting.

The DC to DC converter DK located inside the housing 11 also is concealed. However, the DC to DC converter DK remains accessible for repair or replacement by standard removable parts which are an integral part of the hardware necessary to mechanically hold the fixture 10 together. Insertion of the DC to DC converter DK inside the housing H facilitates operation for both the presence and loss of AC main power.

The AC line magnetic or electronic ballast J operates the standard replaceable compact fluorescent bulb A when the AC main current is present, and the DC to DC converter K operates the same standard replaceable compact fluorescent bulb A when the AC main current is not present.

The low voltage replaceable battery M is installed so that it can easily be removed and replaced. Further a battery connector R attached to the battery leads allows the battery M to be removed for replacement.

(c) FIGS. 3A–6

Other adaptations of the invention are illustrated in FIGS. 3a through 6.

Figure 3A:
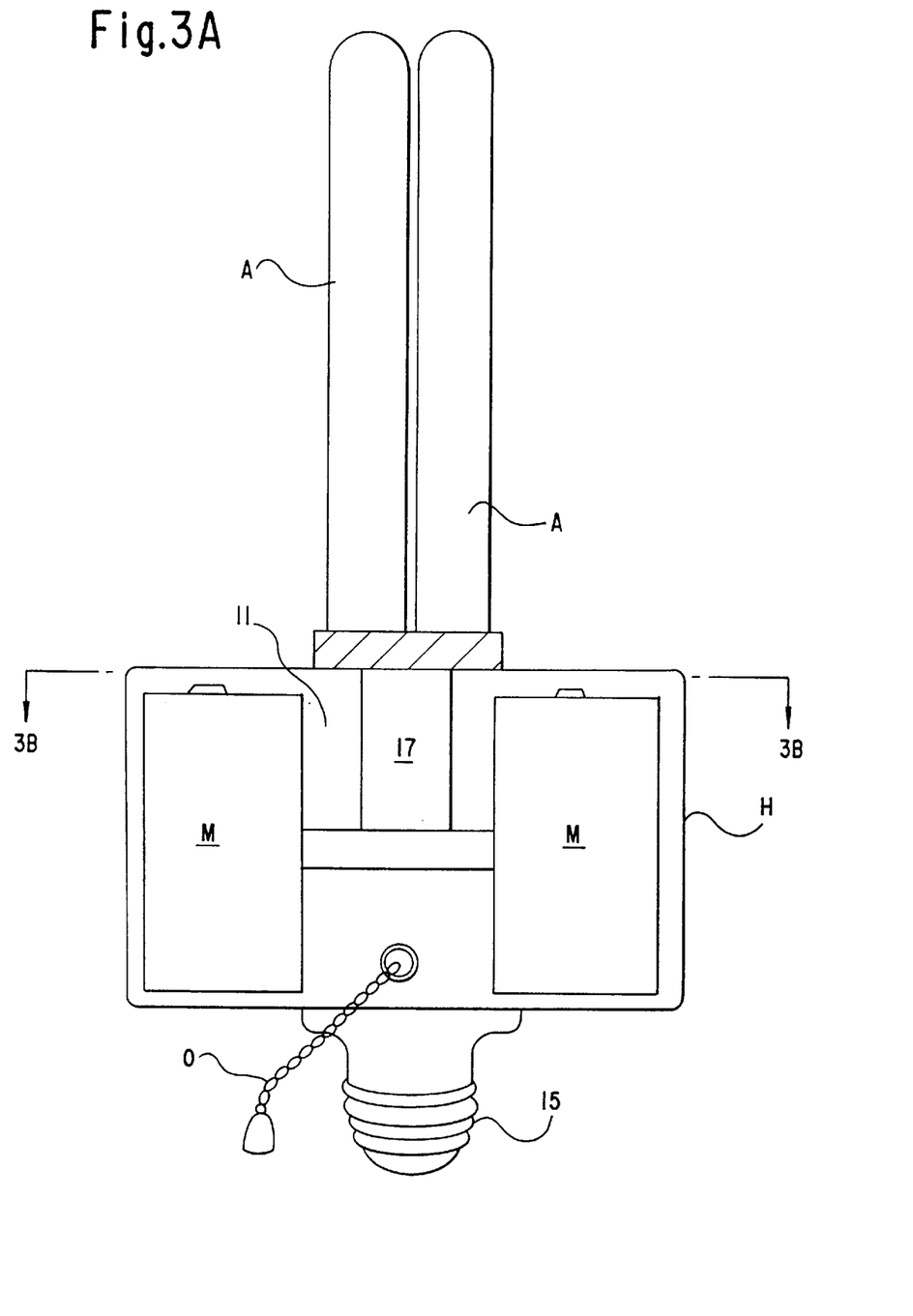
FIG. 3A is an elevational view, partly broken away, showing the fixture of FIG. 1A adapted to a vertically positionable fluorescent lamp.
Figure 3B:
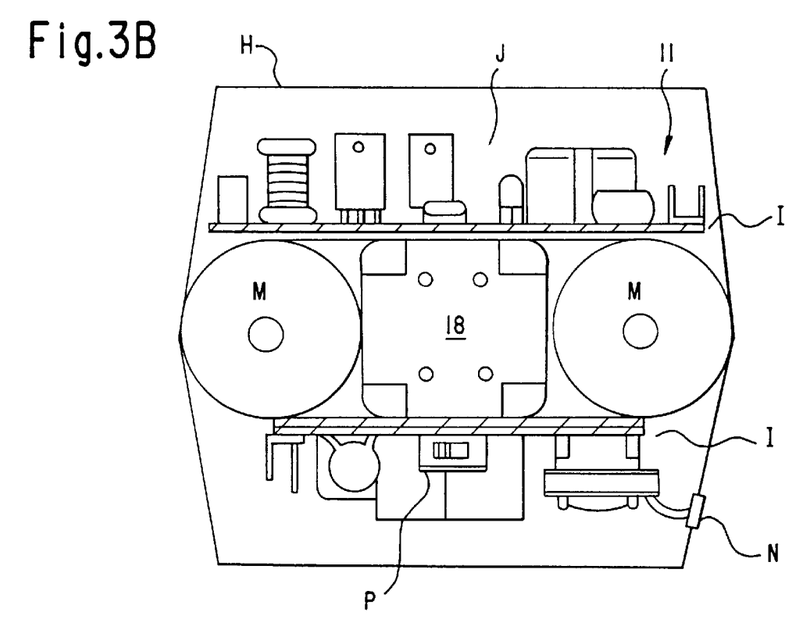
FIG. 3B is a sectional view of FIG. 3A taken along the lines 3B—3B.

In the elevational view, partly broken away, of FIG. 3A the fixture 11 of FIG. 1A adapted to a vertically positionable fluorescent lamps A of a device 30, with FIG. 3B showing a sectional view of FIG. 3A taken along the lines 3B—3B. The twin bulbs A of FIG. 3A, instead of being held by clamps, are inserted into the socket 18 of FIG. 3B by the stem 17 of FIG. 3A. The device 30 can be inserted into a lamp or used with a switch-controlled outlet.

Figure 4A:
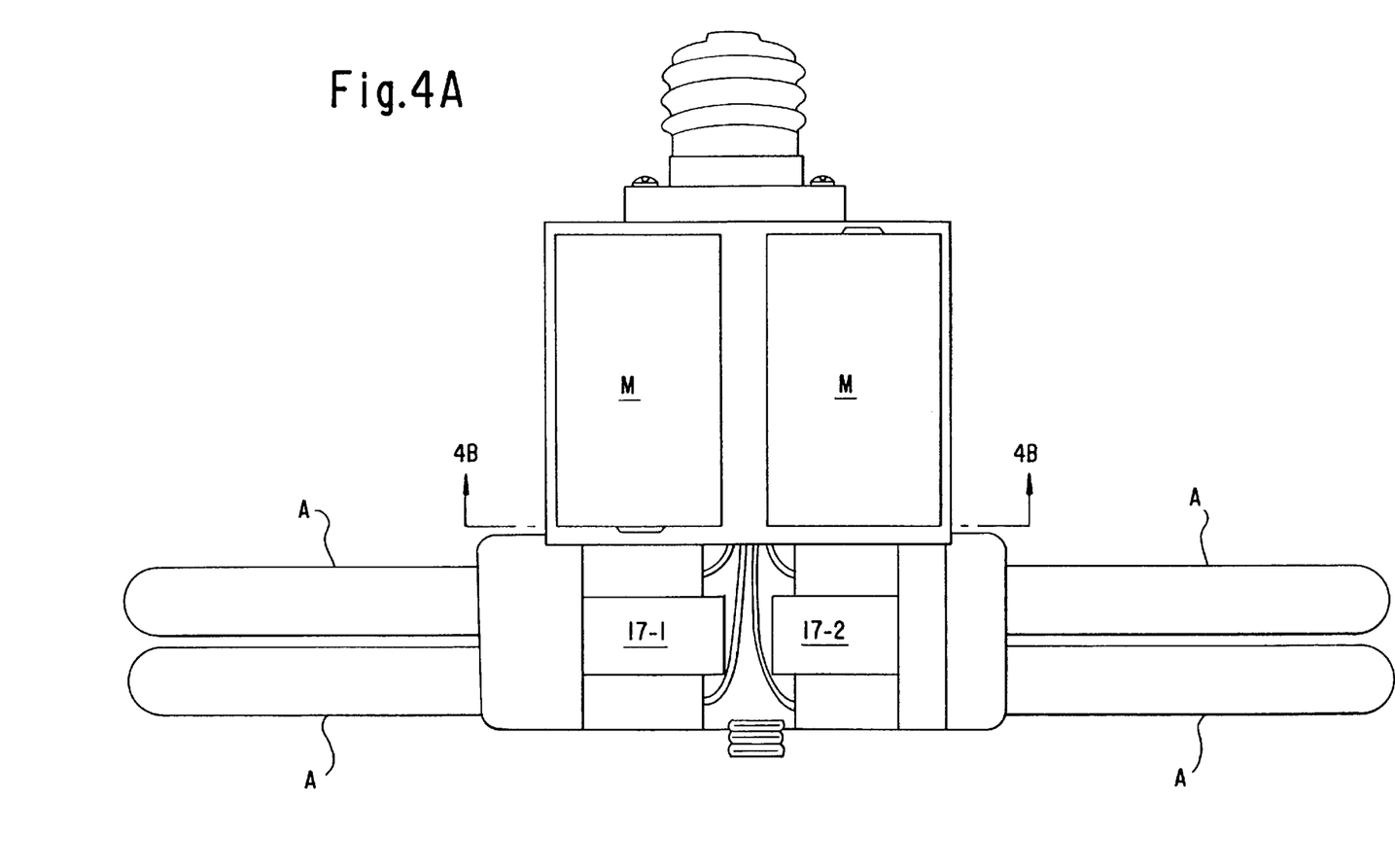
FIG. 4A is an elevational view, partly broken away, showing the fixture of FIG. 1A adapted to horizontally positionable fluorescent lamps.
Figure 4B:
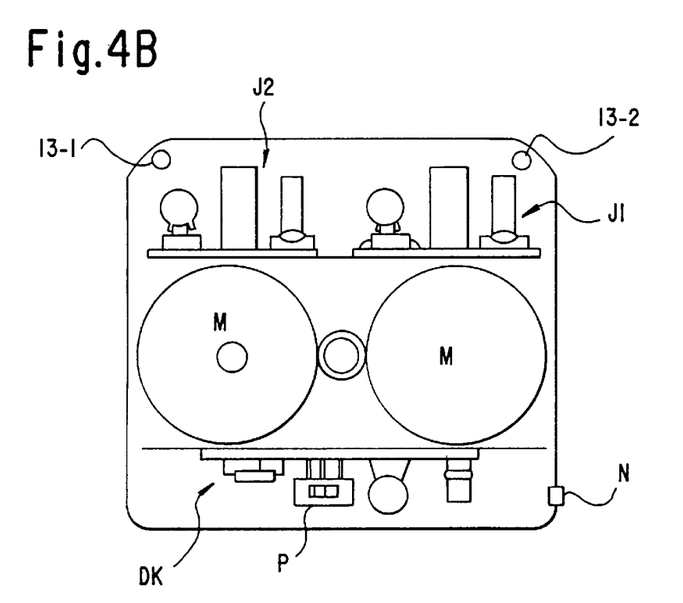
FIG. 4B is a sectional view of FIG. 4A taken along the lines 4B—4B.

In the elevational view, partly broken away, of FIG. 4A the fixture of FIG. 1A is adapted to horizontally positionable fluorescent lamps A of a device 40, with FIG. 4B being a sectional view of FIG. 4A taken along the lines 4B—4B. Each set of twin bulbs A, instead of being held by clamps, are inserted into sockets by respective stem 17-1 and 17-2. The device 40 can be inserted into a lamp or used with a switch-controlled outlet.

Figure 5:
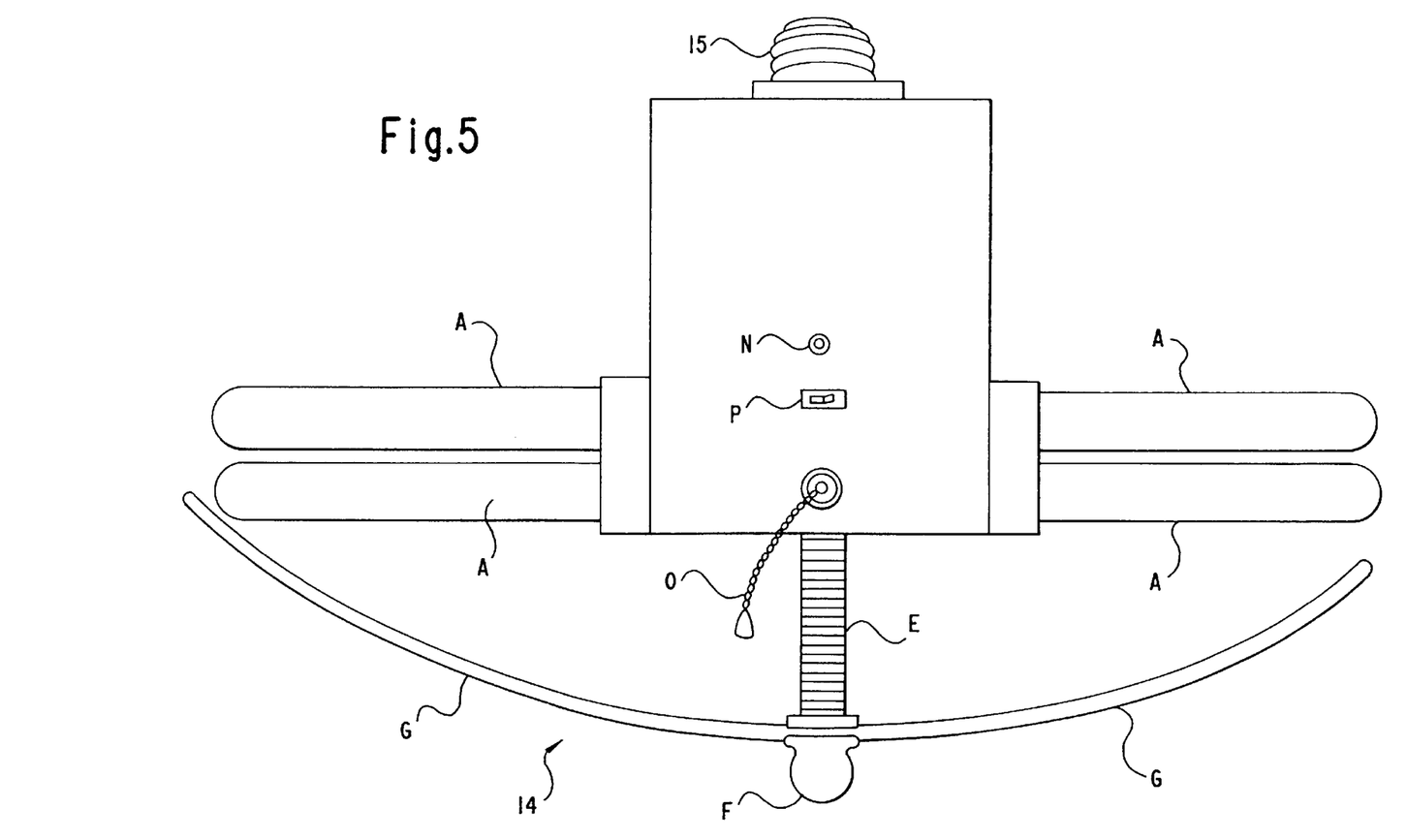
FIG. 5 is an elevational view, partly broken away, showing the fixture of FIG. 4A adapted to a ceiling fixture.

In the elevational view, partly broken away, of FIG. 5 the fixture of FIG. 4A is adapted to a ceiling fixture 50. A glass dome G is held to a nipple E by a ferrule F. The nipple E is suspended from the base of the housing H.

Figure 6:
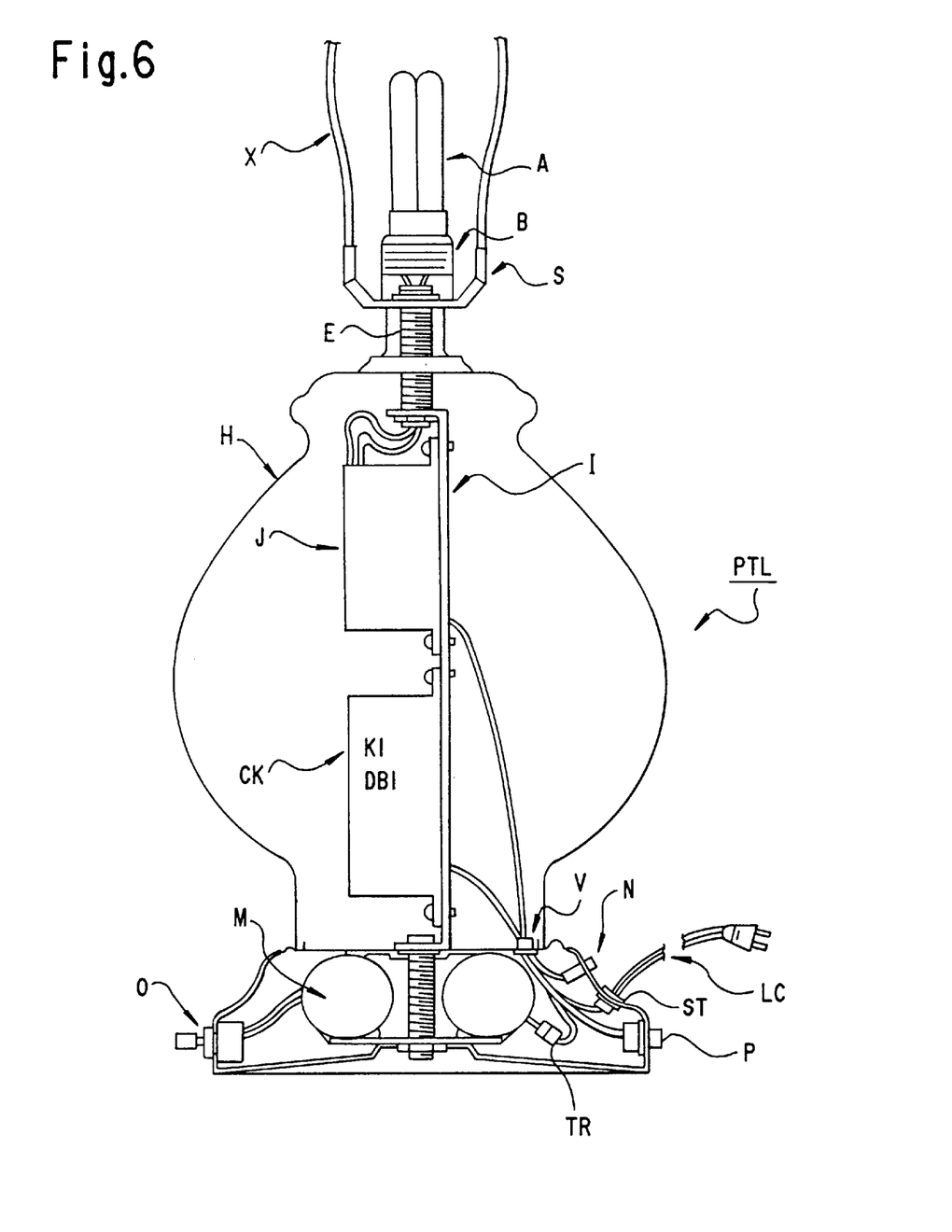
FIG. 6 is a plan view of components and their respective locations for a table lamp adaptation of the invention.
Figure 7A:
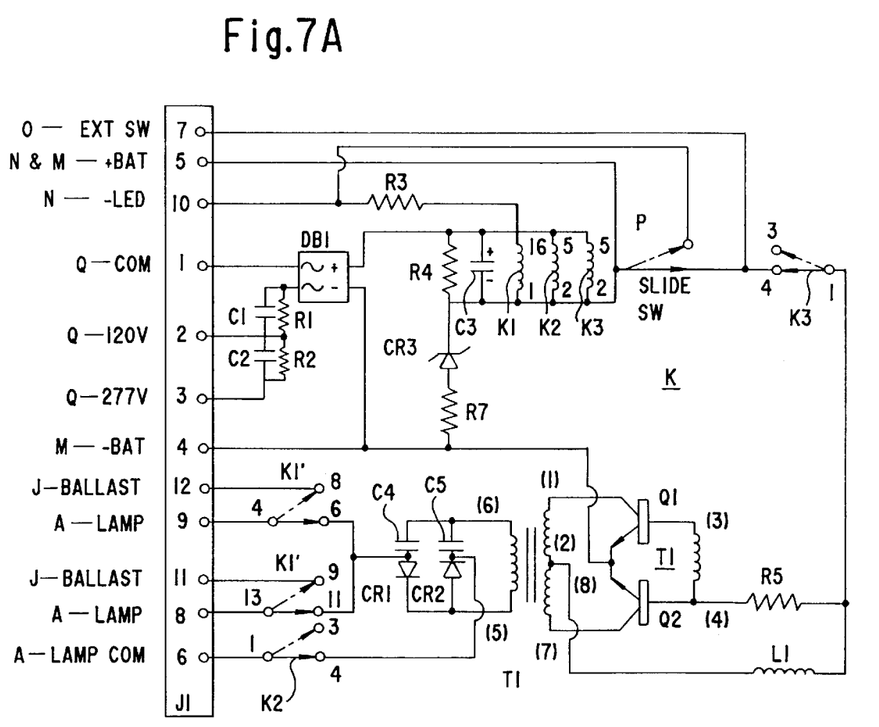
FIG. 7A is a circuit diagram for the back-up power system included in the table lamp of FIG. 6.
Figure 7B:
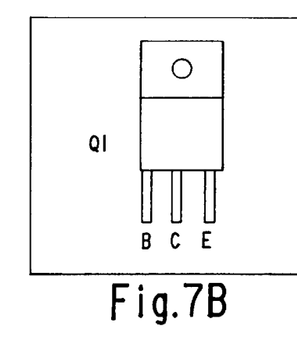
FIG. 7B is a bottom view of a transformer included in FIG. 7A.
Figure 7C:
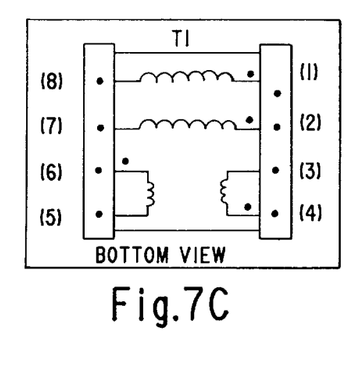
FIG. 7C is a bottom view of a transistor included in FIG. 7A.

In FIG. 6, which is a plan view of components and their respective locations, the invention has been used in another table lamp adaptation of the invention. For the adaptation of FIG. 6, when the AC power is not available, a relay K1 in FIG. 7A disconnects the AC ballast J from the standard portable fluorescent bulb A, and connects the same bulb A to the DC to DC converter DK that is powered by the internal low voltage replaceable battery M located at the base of the portable table lamp PTL.

When the AC power is restored the portable table lamp PTL can automatically recharge the battery M, and the standard portable fluorescent lamp A will remain in the same mode it was in before the loss of the AC main power.

All the components are located inside the decorative envelope H and the lamp base. The back-up power system for the portable table lamp PTL is powered by a standard polarized line cord LC from AC house current. The polarized line cord LC is affixed to the portable table lamp PTL by a strain insulator ST. The portable lamp PTL operates the standard replaceable compact fluorescent bulb A when the AC main power is available, and the standard replaceable compact fluorescent bulb A can be turned off or on by the turn switch O located at the base of the portable lamp. The replaceable low voltage battery M located in the base of the portable lamp is connected to the battery charging circuit DB1 of FIG. 7A powered from the AC mains.

When the AC mains power is not present, the same bulb A that was lighted when AC mains power was available is automatically lighted regardless of the position of the turn switch O prior to the loss of the AC mains power.

When the loss of AC mains power is sensed, relays K1 and K2 disconnect the AC portion of the circuit and connect the DC to DC 'converter DK, which is powered and connected to the low voltage replaceable battery M located in the base L of the portable table lamp PTL. When the AC mains power is restored, the circuit senses the presence of the AC mains power, relays K1 and K2 disconnect the DC to DC converter DK and reconnect the AC mains, thus restoring the bulb A in the portable table lamp PTL to where it was prior to the loss of the AC mains power.

The low voltage replaceable battery M is installed in such a manner that it can easily be removed and replaced by removing a bottom nipple nut to remove a base cover and give access to the battery M. Removal of an additional nut attached to the base nipple and attached to the battery M will free the battery from the hollow compartment in the base of the portable table lamp PTL. Further a battery connector R attached to the battery leads allows the battery M to be removed for replacement The low voltage replaceable batteries M are nicad D cells designed to fit into the hollow base compartment of the portable table lamp PTL.

The base of the portable table lamp PTL is designed to fit a 2-nicad D cell pack M for ease of removal. Such a design of the base hides the 2-nicad D cell pack M from sight, allowing the portable lamp PTL to have a decorative appearance suitable for areas that require or have a decorative setting.

The base cover of the portable table lamp PTL is attached to the base by a base nipple and nut, with the base cover indented to allow the portable table lamp PTL to sit flat on a surface.

The turn switch O is mounted on the base of the portable table lamp PTL to turn the bulb A in the portable table lamp on and off. Further, the turn switch O is wired so that it will not prevent the bulb A from automatically lighting when AC main power is not present.

The LED N mounted on the base of the portable table lamp PTL is lighted when AC mains power is present and indicates that the table lamp will automatically light when the AC mains power is not available.

When the LED N mounted on the base of the portable table lamp is not lighted, it indicates that the AC mains power is not present, or that the AC mains power is present and the portable lamp is not automatically transferred to the back-up mode in the event of an AC mains power failure.

The slide switch P mounted on the base of the portable table lamp has two positions. In one position, it lights the LED N and connects circuitry inside the portable table lamp to automatically back-up when AC main power is not available. In the other position the LED N is not lighted, circuitry located inside the portable table lamp PTL does not respond in the back-up mode when AC mains power is not present. Further the battery M is disconnected to prevent back-up mode operation when AC mains power is not present.

The slide switch P is used to switch the power to the bulb A in the portable table lamp in the "on" or the "off" position when AC main power is not present, allowing the user the option to use the portable lamp in the back-up mode only when it is needed, or preventing the automatic transfer to the back-up mode if no one is home and transfer to the back-up mode would cause a waste of back-up capacity of the battery M or full discharge of the battery.

Placement of the battery M in the hollow compartment of the base of the portable table lamp prevents the battery M from being exposed to excessive heat that is generated by the parts located inside the glass or plastic envelope or vase H.

A bracket I located inside the glass or plastic envelope H makes it possible to mount the DC to DC converter DK and the AC line magnetic or electronic ballast J by mechanical attachment of the bracket I to the base of the portable table lamp, and to the bulb socket B.

A harp saddle S of the lamp PTL is connected to an upper nipple, which is held by a nipple nut. The saddle S holds the harp X, and the harp X can hold a lamp shade.

When the portable table lamp PTL is unplugged, it can be transported to other areas either lighted or not lighted, depending on the position the slide switch P.

The low voltage replaceable batteries M are nicad D cells designed to fit into the hollow base compartment of the fixture 10.

The invention is defined by the claims which appear below. It will be apparent that other adaptations can be made, including the use of the fixtures of the invention for other than lighting.

We claim:

1. A back-up power system powerable from a primary energy source, comprising
    means for energizing, at a first frequency, an electrical device from said primary energy source;
    means for sensing any interruption of power from said primary energy source; and
    means for energizing, at a second frequency different from said first frequency, said device, immediately following said interruption, from an alternative energy source after conversion to an alternative energy state.

2. Apparatus as defined in claim 1 wherein the energizing means responds to the sensing means and converts an output from a rechargeable alternative energy source to power said electrical device during said interruption of power.

3. Apparatus as defined in claim 2 wherein said rechargeable source comprises a battery.

4. Apparatus as defined in claim 1 wherein said electrical device is a fluorescent bulb.

5. Apparatus as defined in claim 1 wherein said alternative energy source generates direct current which is converted a different form of energy.

6. Apparatus as defined in claim 5 wherein said direct current is converted to a different form of direct current.

7. Apparatus as defined in claim 5 wherein said direct current is converted to alternating current.

8. Apparatus as defined in claim 7 wherein said alternating current is converted to different form of direct current than that of said alternative energy source.

9. Apparatus as defined in claim 1 further including means for sensing the restoration of power from said primary source and disconnecting said alternative energy source by terminating the conversion from primary direct current to converted direct current and reconnecting to said primary source;

thereby restoring said device to the condition that existed before interruption of power from said primary source.

10. A back-up power system according to claim 1 wherein said primary source supplies alternating current, further including an alternating current line ballast for powering said device.

11. A backup power system according to claim 1 wherein said alternative energy source energizes a direct-current to direct-current converter.

12. A back-up power system according to claim 10, wherein said line ballast operates said device when alternating current is present and a direct-current to direct-current converter operates said device otherwise.

13. A backup power system according to claim 1 wherein said alternative energy source is a replaceable battery installed to be easily removed and replaced.

14. A backup power system according to claim 13 wherein said replaceable battery is formed by a cell pack that fits into a hollow compartment.

15. A backup power system according to claim 13 wherein said device is for lighting.

16. A backup power system according to claim 13 wherein said device is a retrofit back-up bulb.

17. A backup power system according to claim 13 wherein said device is wall mounted.

18. A backup power system according to claim 13 wherein said device is adapted for recessed downlighting.

19. Apparatus comprising
    a conductive path having one end connectable to a primary energy source and an opposite end connected to a secondary energy source; and
    a switch having open and closed positions inserted into said path, said switch being shunted by an impedance element;
    whereby connection of said path to said primary source, with said switch open permits energy to flow to said secondary source.

20. The method of providing a back-up power system, comprising the steps of:
    (a) connecting a device to a primary energy source;
    (b) sensing any interruption of power from said source; and
    (c) immediately energizing said device from an alternative direct current energy source after conversion to an alternative direct current state when said interruption of power from said primary energy source is sensed and maintaining said alternative energy input during said interruption of power.

* * * * *